(12) United States Patent
Margiott et al.

(10) Patent No.: US 6,989,208 B2
(45) Date of Patent: Jan. 24, 2006

(54) FUEL CELL POWER PLANT USED AS REFORMATE GENERATOR

(75) Inventors: Paul R. Margiott, South Windsor, CT (US); Carl Rohrbach, Somers, CT (US); Michael E. Gorman, Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 511 days.

(21) Appl. No.: 10/058,665

(22) Filed: Jan. 28, 2002

(65) Prior Publication Data

US 2003/0143441 A1     Jul. 31, 2003

(51) Int. Cl.
     *H01M 8/10*    (2006.01)
(52) U.S. Cl. .......................................... 429/17; 429/19
(58) Field of Classification Search .................. 429/17, 429/19, 20, 30, 33, 34
See application file for complete search history.

(56) References Cited

U.S. PATENT DOCUMENTS

| | | | |
|---|---|---|---|
| 4,128,700 A | * | 12/1978 | Sederquist ................... 429/17 |
| 5,009,967 A | | 4/1991 | Scheffler |
| 6,280,865 B1 | | 8/2001 | Eisman et al. |
| 6,316,134 B1 | | 11/2001 | Cownden et al. |
| 6,376,114 B1 | * | 4/2002 | Bonville et al. ............... 429/19 |

FOREIGN PATENT DOCUMENTS

WO     WO 00/74164     7/2000

* cited by examiner

*Primary Examiner*—Michael Barr
*Assistant Examiner*—Monique Wills
(74) *Attorney, Agent, or Firm*—Bachman & LaPointe, PC

(57) ABSTRACT

A method for operating a fuel cell power plant to provide end-use electricity, end-use heat and end-use reformate includes the steps of providing a fuel cell power plant that consumes reformate to provide electricity and heat, said fuel cell power plant having a nominal reformate flow rate and including a fuel processor system for generating reformate from a hydrocarbon fuel; operating the fuel processor system so as to provide a reformate flow at a rate greater than the nominal reformate flow rate; operating the fuel cell power plant using a first portion of the reformate flow to generate the electricity and the heat, the first portion being less than or equal to the nominal reformate flow rate; and providing a second portion of the reformate flow as the end-use reformate.

9 Claims, 1 Drawing Sheet

FUEL CELL POWER PLANT USED AS REFORMATE GENERATOR

BACKGROUND OF THE INVENTION

The invention relates to fuel cell power plants and, more particularly, to a fuel cell power plant and method for operating same whereby an end user is provided with a reformate product in addition to conventionally provide electricity and heat.

A fuel cell is a device which directly converts chemical energy into electrical energy and heat. In a fuel cell, fuel and oxygen are supplied to spaced apart electrodes where the release and acceptance of electrons occurs. An ion transfer electrolyte capable of conducting electrical charge separates the electrodes.

The fuel cell power plant typically operates on fuel which is processed in a fuel processing system (FPS) such as a reformer or the like to produce reformate, a high-hydrogen-content fuel.

Although fuel cell power plants operate exceptionally well so as to provide desired electricity and heat requirements to end use consumers, there are additional needs which are not currently met by conventional fuel cell power plants.

It is therefore the primary object of the present invention to provide a fuel cell power plant and method for operating same wherein additional benefits to the consumer are realized.

It is a further object of the present invention to provide such a fuel cell power plant and method wherein the consumer is directly provided with end-use reformate, as well as electricity and heat.

Other objects and advantages of the present invention will appear hereinbelow.

SUMMARY OF THE INVENTION

In accordance with the present invention, the foregoing objects and advantages have been readily attained.

According to the invention, a method is provided for operating a fuel cell power plant so as to provide end use electricity, end use heat and end use reformate, which method comprises the steps of providing a fuel cell power plant for consuming reformate to provide electricity and heat, said fuel cell power plant having a nominal reformate flow rate and including a fuel processor system for generating reformate from a hydrocarbon fuel; operating said fuel processor system so as to provide a reformate flow at a rate greater than said nominal reformate flow rate; operating said fuel cell power plant using a first portion of said reformate flow to generate said electricity and said heat, said first portion being less than or equal to said nominal reformate flow rate; and providing a second portion of said reformate flow as said end use reformate.

Still further according to the invention, a bleed flow path can be provided for conveying said end use reformate and said bleed flow path can be positioned downstream of said fuel processor system for conveying a portion of said reformate to an end use application.

The fuel cell power plant is typically of the type having a fuel cell stack which consumes the reformate, and the fuel processor system advantageously generates the reformate from a hydrocarbon fuel.

BRIEF DESCRIPTION OF THE DRAWINGS

A detailed description of preferred embodiments of the present invention follows, with reference to the attached drawings, wherein.

DETAILED DESCRIPTION

The invention relates to fuel cell power plants and, more particularly, to a fuel cell power plant and method for operating same wherein excess reformate is generated and provided as a product to consumers along with electricity and heat generated by the fuel cell power plant.

Figure 1:
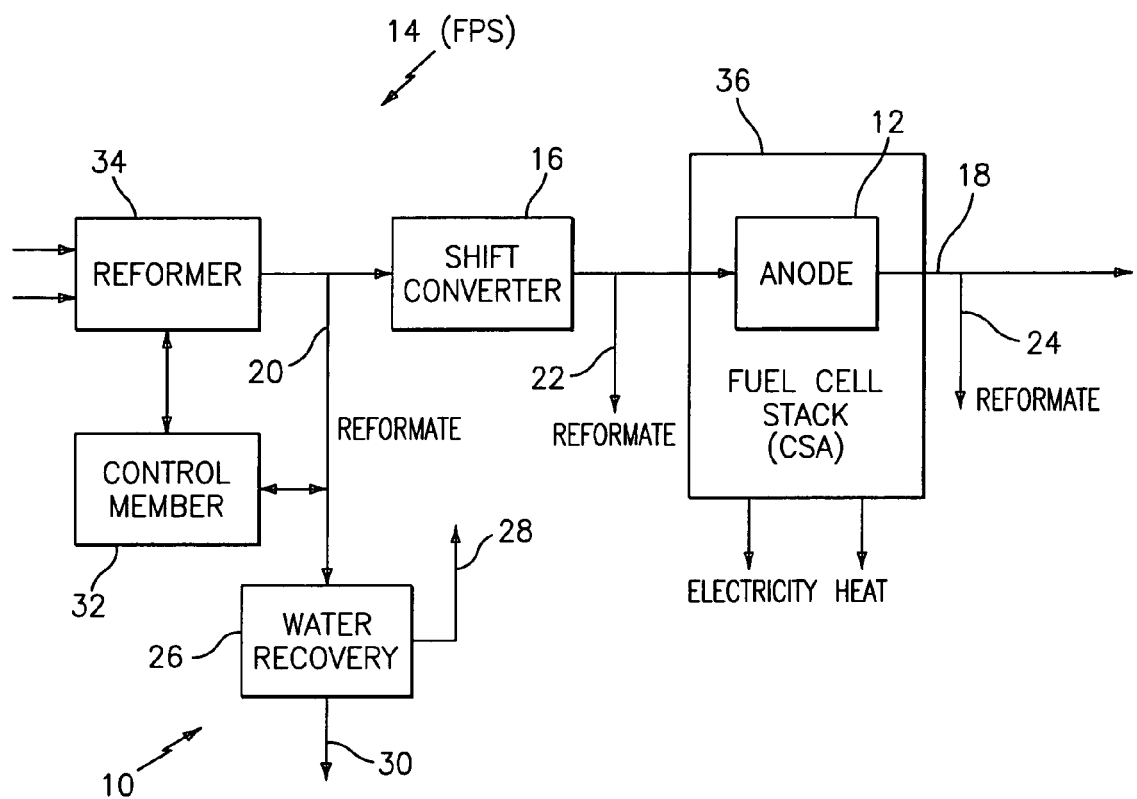
FIG. 1 schematically illustrates a system and method in accordance with the present invention.

FIG. 1 schematically illustrates a system and method in accordance with the present invention. As shown, a fuel cell power plant 10 typically includes at least one fuel cell, typically a fuel cell stack, known as a cell stack assembly or CSA 36, with each cell including an anode 12 and a cathode (not shown). During operation of fuel cell power plant 10, fuel is fed to anode 12 from a fuel processor system (FPS) 14 which typically is operated to treat a hydrocarbon fuel such as methane so as to prepare reformate, a hydrogen rich stream, for feeding to anode 12. FIG. 1 further shows reformate 34 and a shift converter 16 which may frequently be positioned along a line in a fuel processor system 14 of fuel cell power plant 10 for further treating the reformate before feeding to anode 12.

In fuel processor system 14, a hydrocarbon fuel such as methane or the like is typically processed along with steam to provide a reformate flow which is high in hydrogen content. It is also possible to generate reformate without steam addition by using partial oxidizer devices. Shift converter 16, if used, advantageously further enhances the hydrogen content of the stream by converting carbon monoxide to carbon dioxide, thereby increasing free hydrogen as desired. Not shown is a selective oxidizer which can also be in the FPS system 14 down stream of the shift converter. The selective oxidizer functions, as does shift converter 16, to lower the carbon monoxide level in the reformate stream before it is fed to the fuel cell anode 12.

Fuel cell power plant 10 when operated in this manner generates electricity and heat as shown in the drawing, which are referred to herein as end use electricity and heat, as they are used by the end-user or consumer for their desired purpose.

In addition, reformate fed from fuel processor system 14 and/or shift converter 16 is partly consumed in anode 12 to produce an exhaust gas 18 which still contains a portion of the reformate, along with other by-products of the reaction.

Fuel cell power plant 10 typically operates at a nominal fuel flow rate which can readily be determined from various fuel cell characteristics such as anode size, safety factors, expected power demand and the like.

In accordance with the present invention, it has been found that fuel processor system 14 can be operated so as to provide an excess of reformate flow, such that a first portion can be used to operate fuel cell power plant 10 and a second portion can be provided as end-use reformate, that is, reformate which is itself stored and/or used as a commodity, and which is not recirculated for use within the fuel cell power plant 10 itself.

In accordance with the invention, the first portion of the reformate is an amount which is less than or equal to the nominal reformate flow required by fuel cell power plant 10, and the second portion can be any desirable amount up to the remaining balance of flow as generated by fuel processor system 14. The second portion of reformate, which is to be provided as end-use reformate, may be separated off from the first portion from a variety of different locations in accordance with the present invention. FIG. 1 shows a first bleed flow path 20, which is positioned downstream of reformer 34 and upstream of shift converter 16, if present, and CSA 36, and which is a satisfactory location for removal of the second portion of reformate as desired. Alternatively, a bleed flow path 22 can be positioned in accordance with the present invention downstream of shift converter 16, if present, and still upstream of CSA 36. As a third alternative, a bleed flow path 24 can be positioned downstream of CSA 36 at a point where the first portion of reformate has already been reacted within anode 12.

It should be appreciated that bleed flow path 20, 22 and/or 24 may be incorporated into a system and method in accordance with the present invention, either individually or in combination, and that a typical flow-splitting or separating structure will be desired in order to separate this flow path. In this regard, such structure is well known to a person of ordinary skill in the art and would be readily available for incorporation into a reformate flow line as desired.

Water balancing is an important concern in operation of a fuel cell power plant, and some water or water vapor will be present in the second portion of reformate which is removed for other purposes. In order to maintain water balance within the fuel cell power plant, it may be desirable to include some form of water recovery unit, and a water recovery unit 26 is schematically illustrated in FIG. 1 positioned along bleed flow path 20 for separating a recovered water 28 which can be returned to the fuel cell power plant system, and a reformate product 30 as an end-use product without entrained water content. FIG. 1 shows water recovery unit 26 positioned along bleed flow path 20. It should of course be appreciated that water recovery unit 26 could be positioned along bleed flow path(s) 22 or 24, as well, so as to remove water from the reformate second portion as desired. Water recovery unit 26 may be any suitable structure or device which would be well known to a person of ordinary skill in the art.

In further accordance with the present invention, a control member 32 may be provided and associated with fuel processor system 14 and bleed flow path 20, 22 and/or 24. Control member 32 is also preferably operatively associated with fuel processor system 14 so as to be adaptable to control resulting reformate flow produced by fuel processor system 14.

Control member 32 advantageously monitors reformate flow, specifically the second portion of reformate flow, in bleed flow paths 20, 22 or 24 so as to detect when end use reformate is being drawn. At such times, control member 32 is advantageously adapted and programmed to operate fuel processor system 14 at an excess reformate flow rate such that reformate is produced in quantities sufficient to meet both fuel cell power plant demands and end use reformate demands.

Figure 2:
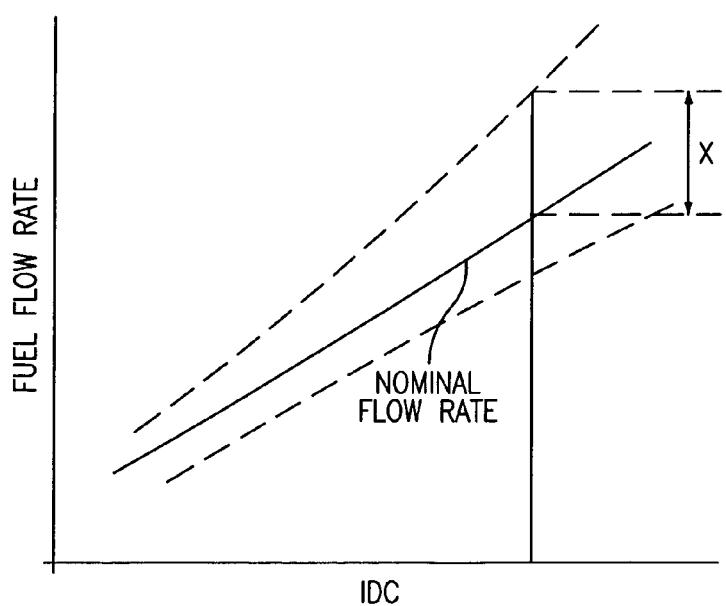
FIG. 2 illustrates the relationship between fuel flow rate to the fuel cell stack and corresponding IDC from the fuel cell stack.

FIG. 2 schematically shows nominal flow rate of fuel to obtain a particular IDC or output, and a higher curve corresponding to an increased flow rate which may be provided according to the invention so as to provide, for example, up to about 20% vol. of total reformate flow as the second portion or end-user reformate as desired.

In this regard, it should readily be appreciated that conventional fuel processor systems can advantageously be operated so as to produce an excess of reformate in the amount up to about 20% volume as compared to the typical nominal fuel flow rate as required by fuel cell power plant 10.

FIG. 1 shows several embodiments wherein the second portion reformate is obtained in three different locations along the processor. It should of course be appreciated that reformate can be bled from the system in other places as well. It is further noted that positioning of bleed flow path 24 downstream of anode 12 advantageously allows for no specific upper limit of reformate that can be separated and used since first portion has already been reacted with anode 12. Thus, if bleed flow path 24 is established downstream of anode 12, then any and all remaining reformate in exhaust stream 18 can be separated and used as desired. If pure hydrogen is desired by the end user, a hydrogen separator device such as a pressure swing absorption unit or a selective membrane could be used. Otherwise the exhaust would typically be fed to a burner in the reformer since the reformer process is endothermic. Alternatively, the waste gas could be vented from the power plant.

It should be appreciated that in accordance with the present invention, a system and method have been provided which allow for operation of a fuel cell power plant so as to provide the expected end use electricity and end use heat, and further to provide end use reformate as desired.

When this system is incorporated upstream of CSA 36, fuel processor system 14 can typically be operated so as to generate an excess of reformate in the amount of 15–20% above the nominal fuel flow rate of the fuel cell power plant, which allows for like amounts to be bled off for providing to customers as end-use reformate as desired. Also as mentioned above, should the reformate bleed path be established downstream of anode 12, then the only limit of reformate which can be provided to a customer is the amount of the reformate remaining in exhaust stream 18 after the process.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for operating a fuel cell power plant to provide end-use electricity, end-use heat and end-use reformate, comprising the steps of:

providing a fuel cell power plant that consumes reformate to provide electricity and heat, said fuel cell power plant having a nominal reformate flow rate and including a fuel processor system for generating reformate from a hydrocarbon fuel;

operating said fuel processor system so as to provide a reformate flow at a rate greater than said nominal reformate flow rate;

operating said fuel cell power plant using a first portion of said reformate flow to generate said electricity and said heat, said first portion being less than or equal to said nominal reformate flow rate; and providing a second portion of said reformate flow as said end-use reformate, wherein said fuel cell power plant includes a fuel cell stack, and said second portion is separated from said first portion upstream of said fuel cell stack.

2. A method for operating a fuel cell power plant to provide end-use electricity, end-use heat and end-use reformate, comprising the steps of:

providing a fuel cell power plant that consumes reformate to provide electricity and heat, said fuel cell power plant having a nominal reformate flow rate and including a fuel processor system for generating reformate from a hydrocarbon fuel;

operating said fuel processor system so as to provide a reformate flow at a rate greater than said nominal reformate flow rate;

operating said fuel cell power plant using a first portion of said reformate flow to generate said electricity and said heat, said first portion being less than or equal to said nominal reformate flow rate; and providing a second portion of said reformate flow as said end-use reformate, wherein said second portion is selectively provided as end use reformate and further comprising the steps of sensing when said second portion is being provided as end-use reformate and selectively operating said fuel processor system to provide a first reformate flow rate when said second portion is not being provided as end use reformate, and to provide a second reformate flow rate greater than said first reformate flow rate when said second portion is being provided as end use reformate.

3. The method of claim 2, wherein said fuel cell power plant includes a fuel cell and wherein said second portion is separated from fuel cell power plant exhaust gas downstream of said fuel cell.

4. The method of claim 1, further comprising the step of storing said second portion.

5. A method for operating a fuel cell power plant to provide end-use electricity, end-use heat and end-use reformate, comprising the steps of:

providing a fuel cell power plant that consumes reformate to provide electricity and heat, said fuel cell power plant having a nominal reformate flow rate and including a fuel processor system for generating reformate from a hydrocarbon fuel;

operating said fuel processor system so as to provide a reformate flow at a rate greater than said nominal reformate flow rate;

operating said fuel cell power plant using a first portion of said reformate flow to generate said electricity and said heat, said first portion being less than or equal to said nominal reformate flow rate; and providing a second portion of said reformate flow as said end-use reformate, wherein said fuel processor system includes a shift converter and said fuel cell power plant includes a fuel cell stack, and further comprising the step of separating said second portion from said first portion downstream of said shift converter and upstream of said fuel cell stack.

6. The method of claim 2, wherein said second portion contains water vapor, and further comprising the step of separating said water vapor from said second portion to provide said end use reformate and a recovered water portion, and returning at least a portion of said recovered water portion to said fuel cell power plant.

7. A fuel cell power plant for providing end-use electricity, end-use heat and end-use reformate, comprising:

a fuel cell that consumes a reformate to provide electricity and heat;

a fuel processor system for generating said reformate from a hydrocarbon fuel, said fuel cell being communicated to receive said reformate from said fuel processor system; and a bleed flow path downstream of said fuel processor system and upstream of the fuel cell for conveying a portion of said reformate to an end use application.

8. The fuel cell power plant of claim 7, further comprising a control member adapted to detect flow in said bleed flow path, said control member being adapted to increase output of said fuel processor system upon detecting flow in said bleed flow path.

9. The fuel cell power plant of claim 7, further comprising a water recovery device positioned along said bleed flow path and communicated with said fuel cell power plant for returning recovered water to said fuel cell power plant.

* * * * *